(12) United States Patent
Vess

(10) Patent No.: US 12,632,468 B2
(45) Date of Patent: May 19, 2026

(54) METHOD AND SYSTEM FOR EVENTUALLY CONSISTENT DISTRIBUTED DATA SHARING

(71) Applicant: Accumulus Synergy, Inc., Burlingame, CA (US)

(72) Inventor: Michael Vess, Baltimore, MD (US)

(73) Assignee: Accumulus Synergy, Inc., Burlingame, CA (US)

( * ) Notice: Subject to any disclaimer, the term of this patent is extended or adjusted under 35 U.S.C. 154(b) by 0 days.

(21) Appl. No.: 18/920,666

(22) Filed: Oct. 18, 2024

(65) Prior Publication Data

US 2026/0111443 A1 Apr. 23, 2026

(51) Int. Cl.
*G06F 16/20* (2019.01)
*G06F 16/27* (2019.01)

(52) U.S. Cl.
CPC ................................. *G06F 16/273* (2019.01)

(58) Field of Classification Search
None
See application file for complete search history.

(56) References Cited

U.S. PATENT DOCUMENTS

| | | | |
|---|---|---|---|
| 6,289,460 B1 | 9/2001 | Hajmiragha | |
| 9,432,452 B2 | 8/2016 | Gibson et al. | |
| 9,955,444 B1 | 4/2018 | Blum et al. | |
| 10,691,820 B1 | 6/2020 | Blum et al. | |
| 10,721,084 B2 | 7/2020 | Simonyi et al. | |
| 11,061,775 B2 | 7/2021 | Nichols et al. | |
| 11,270,069 B1 | 3/2022 | Johnson et al. | |
| 11,816,128 B2 | 11/2023 | Busch et al. | |
| 2012/0259894 A1* | 10/2012 | Varley | G06F 16/954 |
| | | | 707/795 |
| 2013/0191333 A1* | 7/2013 | Long | G06F 16/273 |
| | | | 707/613 |
| 2017/0041296 A1* | 2/2017 | Ford | G06F 21/64 |
| 2018/0322184 A1* | 11/2018 | Voss | G06F 16/2358 |

OTHER PUBLICATIONS

International Search Report and Written Opinion for PCT/US2025/051034 dated Jan. 15, 2026.

* cited by examiner

*Primary Examiner* — Belix M Ortiz Ditren
(74) *Attorney, Agent, or Firm* — Fox Rothschild LLP

(57) ABSTRACT

A platform distributes data between multiple tenants by assigning each tenant a data storage environment that is unique to that tenant. A source tenant may offer destination tenants access to a source data set. Any destination tenant who accepts the offer will get access to the source data set via the copy of the source data set that is replicated to the destination tenant's data storage. The replicating uses an asynchronous process in which, when one or more data elements from the source data set is not successfully transmitted to the first destination tenant data storage environment, transmission of other data elements from the source data set continues until the end of the source data set is reached. Missing data elements are then re-transmitted to the destination.

18 Claims, 8 Drawing Sheets

METHOD AND SYSTEM FOR EVENTUALLY CONSISTENT DISTRIBUTED DATA SHARING

BACKGROUND

Electronic platforms that enable multiple users to exchange information and collaborate on the development of documents or data sets in a cloud-based environment are common. These platforms include file transfer sites or document repositories in which a user can upload documents to a server and give other users permission to access and download the documents. These platforms also include document collaboration platforms, such as those widely available from major word processing software providers.

Existing platforms are suitable for situations in which a single user uploads a document and controls other users' access and editing rights. However, existing systems do not allow distributed management and access control definitions, nor do they allow collaboration with users that the publisher may not know. This can impair security and make tenants hesitant to share certain data elements with each other.

In addition, when the data set being shared is large, existing systems are prone to errors or inconsistent distribution of data. Due to latency, communications network disruptions and other factors, multiple users of a data set may see different versions of the data set at any given time.

This document describes methods and systems that are directed to solving at least some of the issues described above.

SUMMARY

Certain embodiments described below relate to a method and system for distributed sharing of data by proxy. In these embodiments, a platform distributes data between multiple tenants by assigning each tenant a data storage environment that is unique to that tenant. A source tenant stores a data set in the source tenant's data storage environment. A destination tenant stores access control rights for its users in the destination tenant's data storage environment. When a user requests content from the source data set, the platform determines whether the requested content corresponds to the user's access control rights, and also whether the source tenant has authorized the destination tenant to access the source data set. If the requested content corresponds to the user's access control rights and the source tenant has authorized the destination tenant to access the source data set, the platform provides the user with the requested content. The source tenant is not provided any information about the access control rights or the identity of the user.

Certain embodiments described below relate to a method and system for eventually consistent distributed data sharing. In these embodiments, a platform distributes data between multiple tenants by assigning each tenant a data storage environment that is unique to that tenant. A source tenant may offer destination tenants access to a source data set. Any destination tenant who accepts the offer will get access to the source data set via the copy of the source data set that is replicated to the destination tenant's data storage. The replicating uses an asynchronous process in which, when one or more data elements from the source data set is not successfully transmitted to the first destination tenant data storage environment, transmission of other data elements from the source data set continues until the end of the source data set is reached. Missing data elements are then re-transmitted to the destination.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to."

In this document, when terms such as "first" and "second" are used to modify a noun, such use is simply intended to distinguish one item from another and is not intended to require a sequential order unless specifically stated. The term "approximately," when used in connection with a numeric value, is intended to include values that are close to, but not exactly, the number. For example, in some embodiments, the term "approximately" may include values that are within +/−10 percent of the value.

Additional terms that are relevant to this disclosure will be defined at the end of this Detailed Description section.

This document describes a unique data distribution platform that provides a collaborative experience for multiple tenants. In some embodiments, it can provide distribution of data in an efficient, eventually consistent manner among the tenants. This can help reduce errors in data distribution. It can also help ensure that all tenants are eventually receive consistent data set versions. In some embodiments, it can also make data available to multiple tenants in a way that allows each tenant to set access control parameters for its individual users, while not revealing individual users' identities or access control parameters to the source of the data. This can help increase security and encourage tenants and their users to collaborate with the knowledge that their identities and activity will not be revealed to all others.

Figure 1:
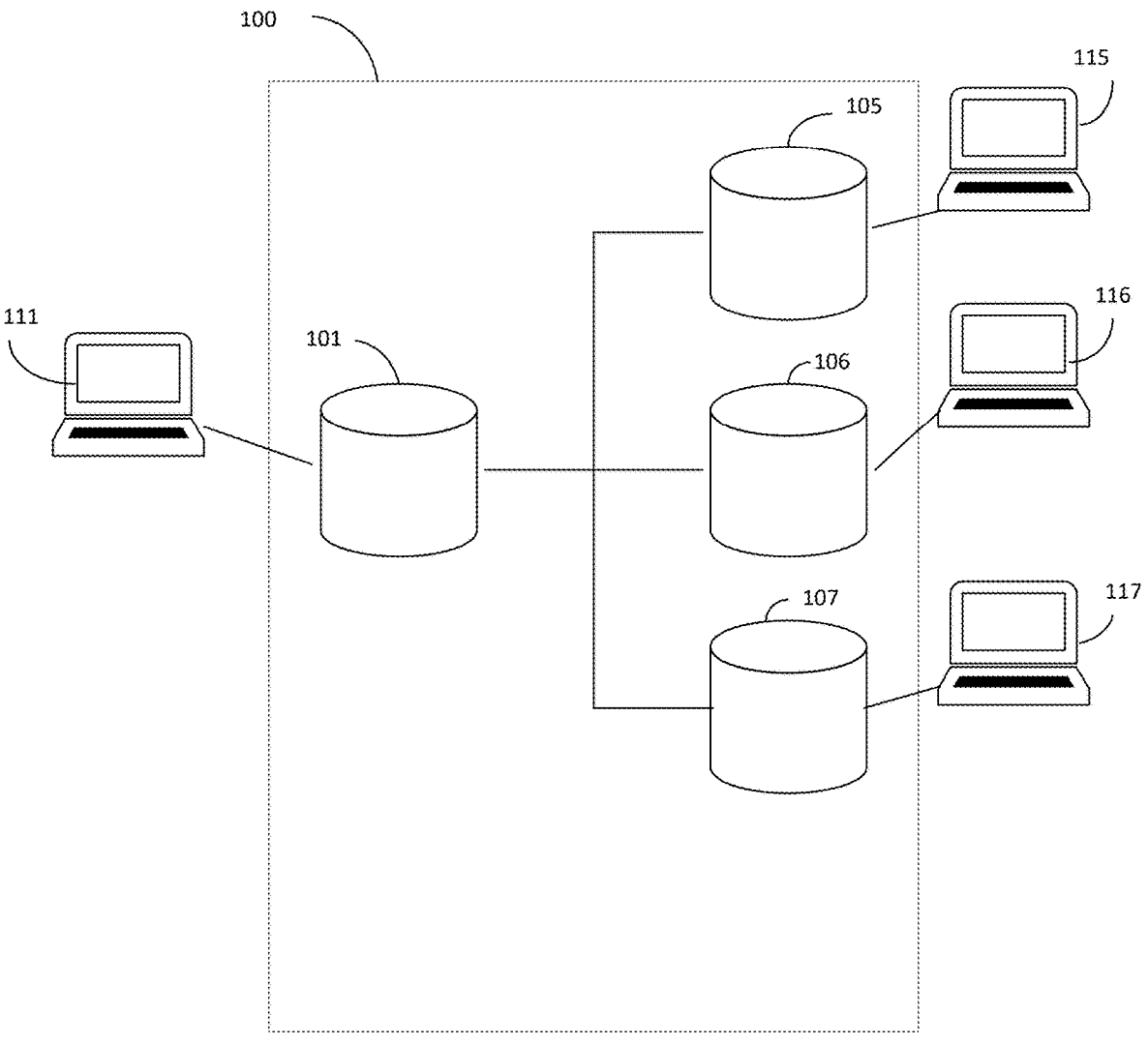
FIG. 1 illustrates a system in which multiple users of a data distribution platform can share and collaborate on data.

FIG. 1 illustrates an environment in which multiple users of a data distribution platform 100 can share data and collaborate on the development of data. The platform 100 is a cloud-based platform-as-a-service environment that includes one or more servers and/or data centers that are connected with each other and users via one or more communication networks, such as an intranet or the internet.

Each user uses an electronic device 111 and 115-117 to communicatively connect to the platform via one or more communication channels.

The server(s) and data center(s) of the platform 100 may be located in a single location, or various servers and/or data centers of the platform may be remotely distributed from each other and communicatively connected to each other via one or more communication paths. A single-location system may be beneficial (such as for cost-effectiveness) when all users of the system are in a single geographic region. When users are remotely distributed, a remotely distributed platform may help provide a better user experience, since a distributed system allows users to access their local data center or server with relatively low latency, and/or to access a different server or data center if their first access attempt fails due to system or communication network errors. In some embodiments, the platform 100 may be a distributed system in the form of a peer-to-peer network in which each one or more of the user electronic devices are part of the platform, and each such user electronic device includes a local data storage environments for the device's user.

Each user may be an individual person or electronic device, or a person or device that is a member of an organization that with which multiple users are associated. This document may use the term "tenant" to refer to a user or organization that that holds access credentials that enable the user or members of the organization to access and use the platform. The term "tenant user" will refer to an individual user or member of an organization. The term "tenant entity" will refer to an organization with which multiple tenant users are associated. A "tenant administrator" is a user or automated system of a tenant entity that sets access control permissions for, and monitors use of the system by, the tenant entity's various tenant users.

The platform 100 will include one or more data stores that receive data from some tenants and share that data with other tenants who are authorized to access the data. This document may refer to any tenant who originates the sharing of data to the platform as a "source tenant." Any tenant who is authorized to receive and access such data is a "destination tenant." Optionally, a "destination tenant" also may be permitted to modify data that it receives and share the modified data with other tenants, in which case the destination tenant for the original data also may be a source tenant for the modified data.

In some embodiments, the source tenant may specify the destination tenants to whom it will offer data. In other embodiments, the source tenant and destination tenant need not be known to each other, in which case the source tenant may simply authorize the sharing of data with other tenants who the platform determines meet specified criteria (such as industry category and/or being part of a defined group of tenants).

Some parts of the platform's data store may be accessible to all authorized tenants. In addition, the platform 100 may partition at least some of its data store into various data storage environments 101 and 105-107, each of which is associated with a unique tenant. For example, FIG. 1 illustrates a platform in which data storage environment 101 is associated with tenant 111, and data storage environments 105-107 are associated with tenants 115-117, respectively. Each data storage environment may be a tenant-specific environment that is: a unique database that is dedicated to a single tenant; a database that is divided into multiple partitions or shards according to a sharding pattern or a Geode pattern; a unique data storage device; a unique sector of a memory device; a unique virtual container; or another multi-tenant structure in which a tenant's data may be isolated and not accessible to other tenants. The multi-tenant structure may be employed in a single device or database, or in multiple devices or databases. The platform operator may operate and maintain the data storage environments using any of the options discussed above, or each tenant may operate and maintain its own data storage environment on or with its user electronic device as part of a distributed, peer-to-peer platform.

The system may replicate portions of data sets or entire data sets from one of the tenant's data storage environments to other tenants' data storage environments, as will be described in more detail below.

Figure 2:
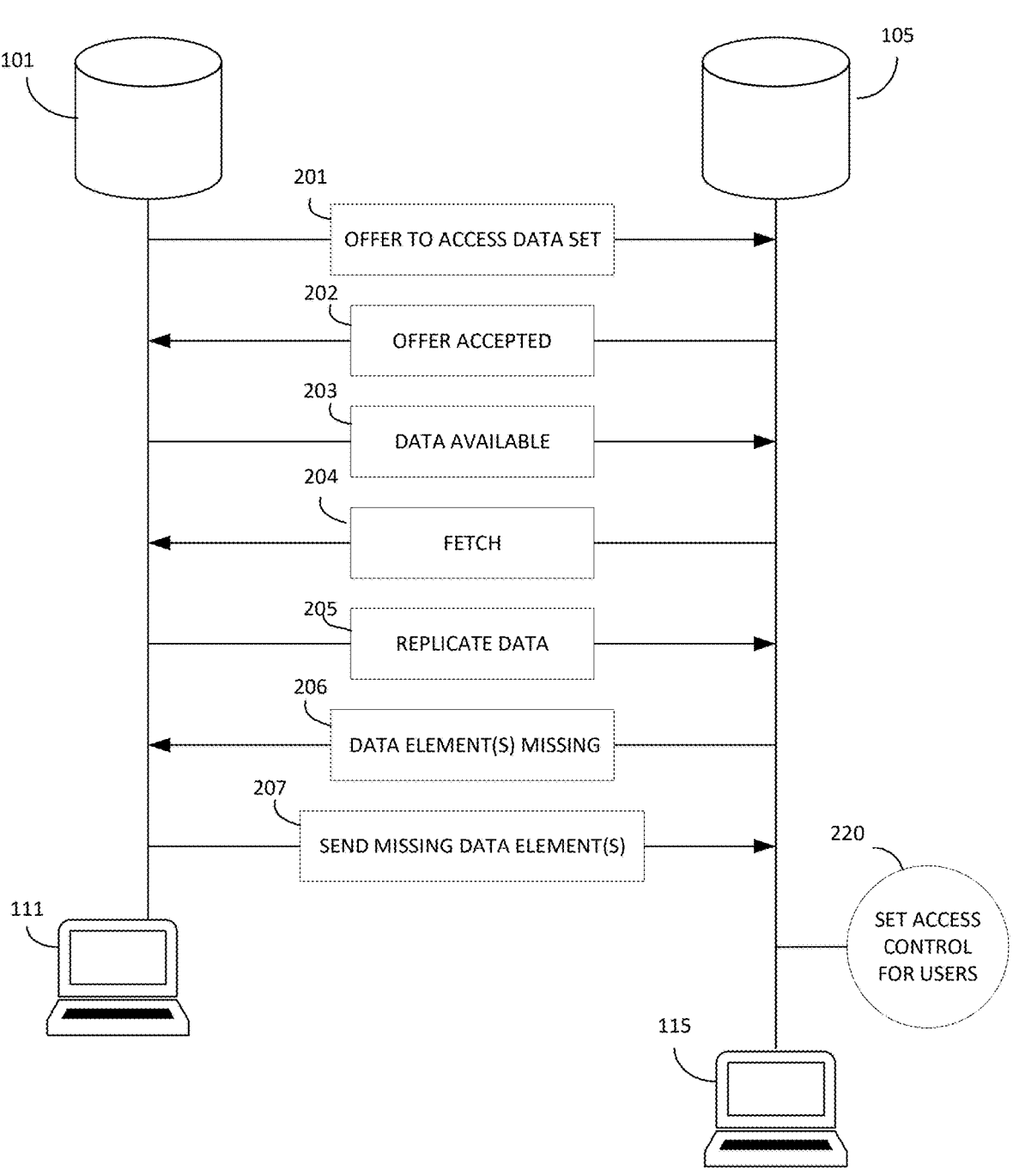
FIG. 2 illustrates basic elements of a process by which a source tenant of the platform may share data with one or more destination tenants of the platform.

FIG. 2 describes basic elements of a process by which a source tenant (represented by source tenant electronic device 111) may share data from the source tenant's data storage environment 101 with one or more destination tenants (represented by destination tenant electronic device 115). As discussed above in the context of FIG. 1, the system will initially assign each tenant of the platform a secure data storage environment within the platform that is unique to that tenant. The platform may receive a request from the source tenant 111 to share a source data set that is in the source tenant's data storage environment 101 with one or more destination tenants 115. When this happens, then in response to the request, the platform will present the destination tenant 115 with an offer to access the data set (step 201). The platform may present the offer in the form of an electronic message that is displayed on or audibly output by the destination tenant's electronic device.

The destination tenant 115 may have the option to accept or reject the offer. Acceptance may require an affirmative response from the destination tenant 115 before a threshold time period expires. Alternatively, the system may infer acceptance if the destination tenant 115 does not decline the offer within the threshold time period. The system's protocol that defines whether acceptance should be automatic or require an affirmative response may be set (a) by the source tenant for the source data set, (b) by the destination tenant for all possible data sets, or (c) by the platform as a default. In any of these cases, the platform may only share the source data set with the destination tenant 115 if the platform receives (whether affirmatively or by inference) the destination tenant's acceptance of the offer step 202). In response to receiving acceptance of the offer, the system will give the destination tenant 115 access to the source data set by replicating a copy of the data set from the source tenant's data storage environment 101 to the destination tenant's data storage environment 105. When this happens, the original data set will remain in the source tenant's data storage environment 101, and a copy of the data set will be housed in the destination tenant's data storage environment 105.

Optionally, the replicating may happen (at step 205) automatically upon receiving the destination tenant's acceptance of the offer. Alternatively, the platform may inform the destination tenant that the data set is available (at step 203), and it may then only replicate the data set to the destination tenant's data storage environment 105 after the destination tenant or the system replies with a data fetch instruction (step 204). This may allow the platform to process or otherwise prepare the copy of the data set that will be delivered to the destination tenant's data storage environment 105. For example, before delivering the copy the platform may remove data elements that the destination tenant is not authorized to access, remove duplicate data elements, or update data elements based on information received from other tenants. Waiting for a fetch instruction (step 204) also gives the destination tenant or another element of the system the opportunity to wait and only receive the copy when the destination tenant's data storage environment 105 is online or not busy processing other requests.

In some embodiments, the replicating of the data set from source to destination uses an asynchronous process in that, when one or more data elements from the source data set is not successfully transmitted to the destination tenant data storage environment 105, transmission of other data elements from the source data set continues until the end of the source data set is reached. After the end of the source data set is reached (i.e., when the last data element in the source data set is replicated to the destination), the platform will then go back and subsequently transmit any data elements that were not successfully transmitted to the destination on the first attempt. To accomplish this, at step 206 the platform may receive a notification from the destination tenant indicating that data elements were not successfully received.

This notification may result from one of several possible methods of examining the received data elements. In some embodiments, the source may generate a table, list, or other set with records that include unique identifiers (IDs) for each data element. The records for each data element also may include information such as a timestamp indicating when the data set was offered, a timestamp of the most recent change to the data set, and/or other information. Additional information about example records will be described below. When transmitting the data elements, each data element may include metadata, and the metadata may include that data element's unique ID. In one option, the source tenant may send the set of data element records to the destination tenant. The destination tenant may then compare the data element IDs in the records to those in the metadata of the data elements that it received. If any data element IDs are missing from the received metadata, the destination may provide the source tenant the data element IDs that are missing. In another option, the source tenant may retain the data element records and not send them to the destination tenant. Instead, the destination tenant may identify the data element IDs that it received, and the destination tenant may provide those received data element IDs to the source tenant. The source tenant may then compare the received data element IDs to those in the records to identify which data element IDs are missing. A missing ID will indicate that a data element was not successfully received by the destination tenant.

In response to receiving the notification, at step 207 the platform will copy the missing data elements (i.e., the data elements that the destination tenant did not receive) from the source data set to the destination tenant data storage environment 105.

Although FIG. 2 and the discussion above describe a single destination tenant, FIG. 1 illustrates that a source tenant may offer data sets to multiple destination tenants. Thus, the process of FIG. 2 may happen concurrently for any number of additional destination tenants. The asynchronous transmission of data to all destination tenants allows all destination tenants to eventually receive a complete and up-to-date data set as soon as the communication network permits it, without waiting for other processes to be completed. In addition, each destination tenant will receive as much data as the communication network enables, so that the destination tenant can start to access at least some of the data while waiting for the missing data to arrive.

As described above, each destination tenant may be an entity having multiple individual users, at least some of which will receive access to the copy of the source data set that is in the first destination tenant's data storage environment. The source tenant will not receive any identifying information about some or all of the destination tenant's users. Instead, the destination tenant will set up and manage access control rights for its users (at step 220).

When making a data set available for replication, the source tenant (or the platform by default) may assign a replication class to the data set. The platform will use the class to define the replication process. This system may use one or more of the following replication classes: Copy, Share, or Sync. The system may use different words to represent each class, but in general each replication class will be associated with a particular replication protocol.

Figure 3:
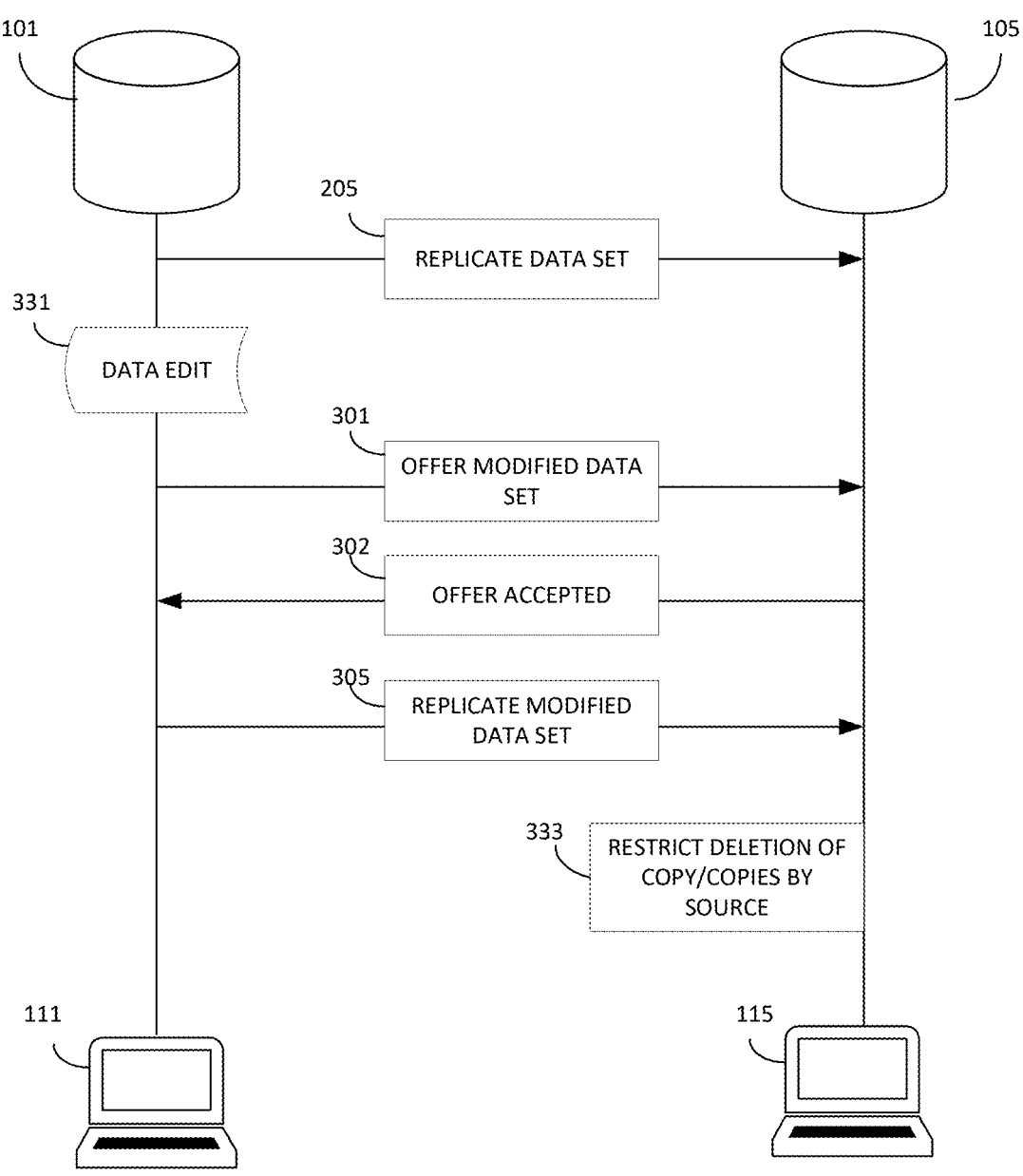
FIG. 3 illustrates an example data sharing protocol that this document refers to as a "Copy" replication protocol.

A first replication protocol, Copy, is illustrated in FIG. 3. In the Copy protocol, data is copied from the source to the destination at 205 as illustrated in FIG. 2. The content then exists in both the source tenant's and destination tenant's storage environments. Once the replication is complete, if the source tenant modifies the data set (step 431), the destination tenant will retain the original data set and will be unaware of the changes unless the source tenant offers the modified data set as a new data set (step 305). If the destination tenant accepts the offer for the modified data set (step 302), replication is performed for the modified data set (step 305) using the replication process described above in the context of FIG. 2. The destination tenant 115 will then have access to both the original data set and the modified data set in full, unless the destination tenant actively deletes the original data set. The source tenant will not be permitted to revoke the destination tenant's access or delete the data set from the destination tenant's data storage environment 105 (as illustrated by step 333).

Figure 4:
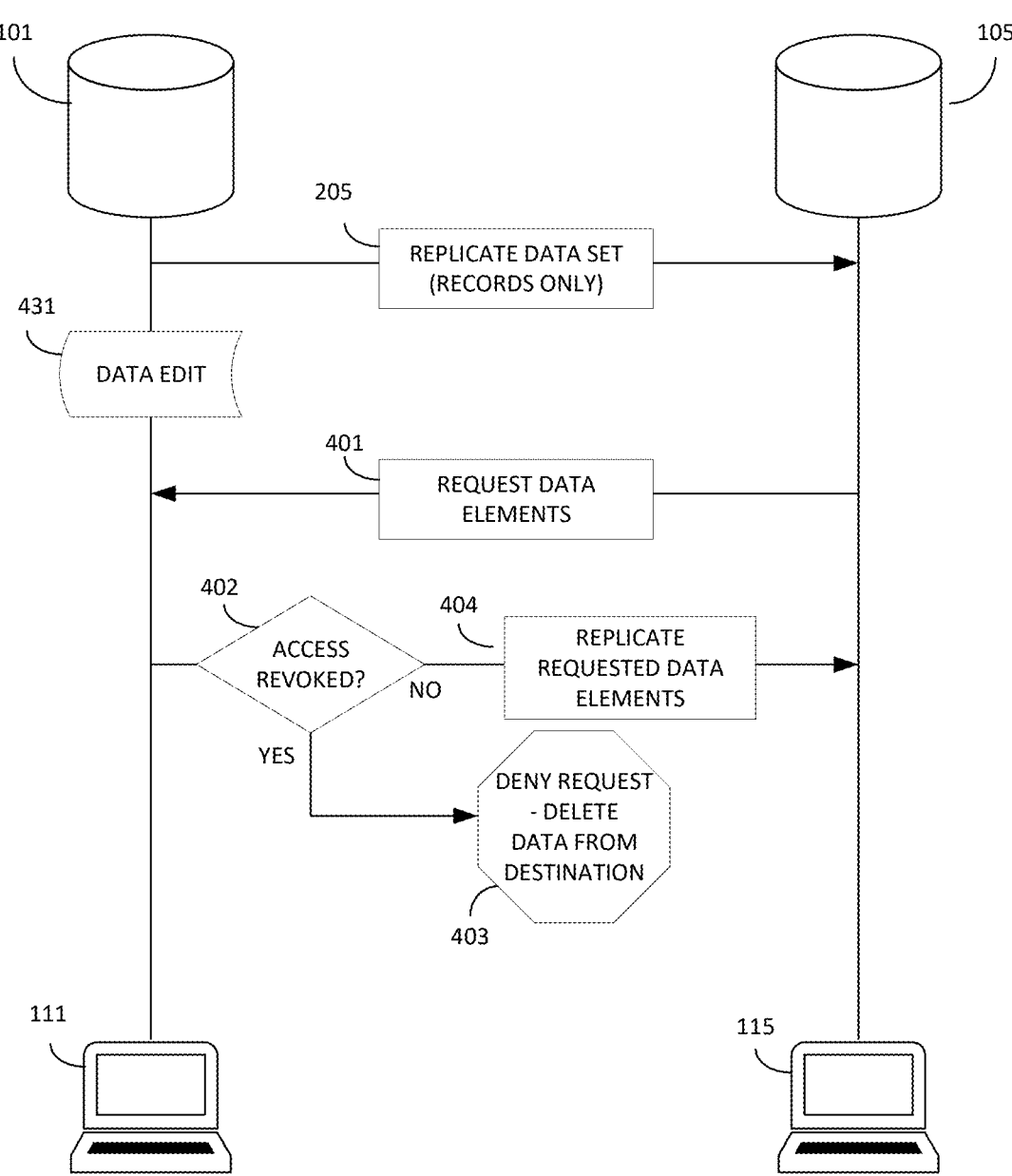
FIG. 4 illustrates an example data sharing protocol that this document refers to as a "Share" replication protocol.

A second replication protocol, Share, is illustrated in FIG. 4. In the Share protocol, the full data set is not copied from the source to the destination at 205. Instead, a set of records for the data in the data set is copied from the source to the destination at 205. The records may include, for example, the unique data ID for each data element, along with an ID for the source tenant. The destination tenant uses these records to make a specific request for specific data at 401, as the data request will include the data element IDs for the requested data.

To receive updated data, the destination tenant must affirmatively request the data at step 401. So long as the source tenant has not revoked the destination tenant's access to the data set (402: NO), replication is performed for the requested data (step 405) using the replication process described above in the context of FIG. 2. The requested data elements will then be saved to destination tenant's storage environment 105 so that the destination tenant then has the requested data. If the source tenant revoked the destination tenant's access (402: YES) the system will deny the request and any data of the data set from the destination tenant's data storage environment 105 if not already deleted (step 403).

In addition, as noted above the source tenant can revoke the destination tenant's access at any time, in which case the platform will delete the copy of the data set from the destination tenant's data storage environment 105.

The platform may automatically make data requests at 401 on behalf of the destination tenant at defined time periods or in response to certain triggering events, or the destination tenant may initiate the request by providing a command to the platform With the share process, because the source tenant creates a data edit that modifies the source data set (step 431), the modified data set remains in the source tenant's data storage environment 101 but is not automatically offered to the destination tenant. Instead, because data is only transferred to the destination in response to active requests, the data returned at 404 will always be the most current data.

Figure 5:
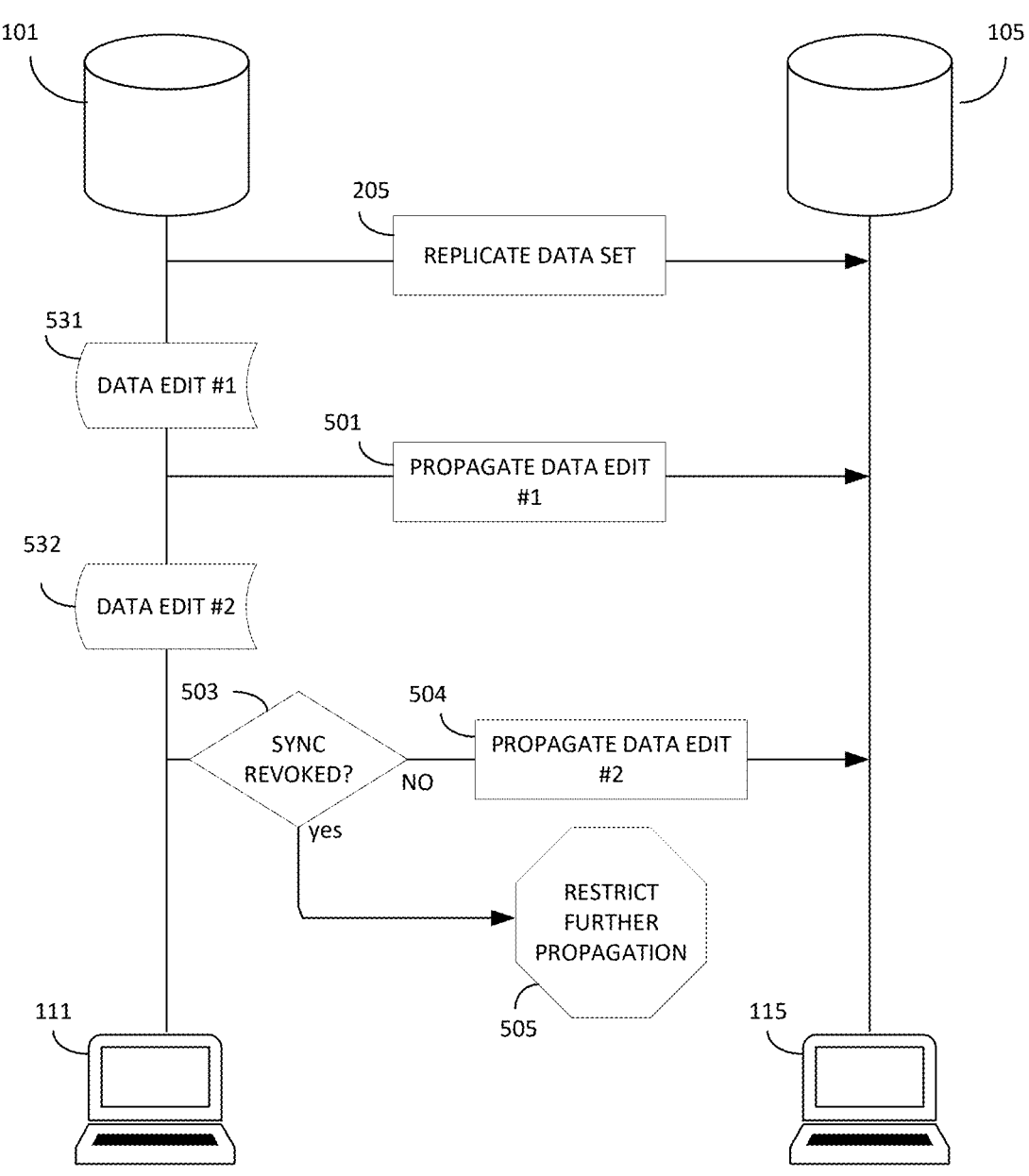
FIG. 5 illustrates an example data sharing protocol that this document refers to as a "Sync" replication protocol.

A third replication protocol, Sync, is illustrated in FIG. 5. In the Sync protocol, a data set is copied from the source to the destination at 205 as in FIG. 2. The content then exists in both the source tenant's and destination tenant's storage environments. Once the replication is complete, if the source tenant creates a first data edit that modifies the source data set (step 531), edit is saved to the data set in the source tenant's data storage environment 101 and also automatically propagated to the copy of the data set that is in the destination tenant's data storage environment 115. This will continue at step 504 for subsequent data edits 532 unless and until either of the tenants revokes the sync protocol. When a tenant revokes the sync protocol (503: YES), then any future updates to the data set will not automatically be propagated to the destination tenant's copy of the data set (step 505), and the data set will remain in the destination tenant's environment 115 without any future changes. After the sync is revoked, the protocol may then revert to the Share protocol or the Copy protocol, depending on the system settings.

In any of the protocols above, when replicating data sets the platform may retain a central database and/or one or more tenant-specific databases with records that enable the platform to identify which data sets, and which versions of each data sets, and which elements within data sets have been replicated to which tenants. For example, the system may maintain a table of entity distribution records with information such as the following:

| Column | Type | Description |
|---|---|---|
| id | UUID | The ID of the distribution record |
| tenant_id | String | The tenant ID for the owner of this record |
| ${ENTITY}_id | UUID | The foreign key reference to the distributed entity |
| source_tenant_id | String | The tenant ID for the Source of the data Note: On the Source, this will be the same as the tenant_id. |
| destination_tenant_id | String | The tenant ID for the intended Destination of the data Note: On the Destination, this will be the same as the tenant_id. |
| distribution_type | Enum One of: SHARE, COPY, SYNC | The distribution mechanism used for this data |
| parent_distribution_record_id | Enum | A state of the parent record, such as COMPLETE or REVOKED if in a terminal state. |
| distribution_status | Enum | The current status of the data distribution. |
| | See the distribution statuses table below for acceptable values | The value may be different on Source and Destination tenants depending on the distribution progress. |

The platform also may maintain records indicating the distribution status of each data set, to enable it to track the status of each data set offer, acceptance or rejection, and replication process. For example, the system may maintain a table of distribution statuses with information such as the following:

| Status | Scope | Description |
|---|---|---|
| OFFERED | Source, Destination | The Source has made a distribution offer to the Destination |
| OFFER_ACKNOWLEDGED | Source | The Destination has acknowledged receipt of the distribution offer |
| OFFER_ACCEPTED | Source, Destination | The Destination has accepted the distribution offer |
| OFFER_ACCEPT-ANCE_ACKNOWLEDGED | Destination | The Source has acknowledged receipt of the distribution acceptance |
| OFFER_REJECTED | Source, Destination | The Destination has rejected the distribution offer |
| OFFER_REJECT-ION_ACKNOWLEDGED | Destination | The Source has acknowledged receipt of the distribution rejection |
| DATA_AVAILABLE | Source, Destination | The Source has made the data available to the Destination for access |
| DATA_AVAIL-ABLE_ACKNOWLEDGED | Source | The Destination has acknowledged receipt of the data availability from the Source |
| DATA_COPIED | Source, Destination | The Destination has successfully fetched and copied the data |
| DATA_COPY_ACK-NOWLEDGED | Destination | The Source has acknowledged receipt of the Destination's copy completion |
| COMPLETE | Source, Destination | The distribution has concluded successfully. No further action for this record will occur. |
| REVOKED | Source, Destination | The Source has revoked the distribution. No further action for this record will occur. This should only occur for distributions of type SHARE and SYNC. |

The data elements in the source data set may be any types of digital data in any format. For example, each data element may be one or more document files, spreadsheets, source code for computer programs, images, video files, audio files, or the like. By sharing data sets as described in this document, the system enables organizations to collaborate and share documents or other data in a secure manner, in which source tenants can control which other tenants can access or further share use the data, and destination tenants can control what each of their individual tenants can do with the data.

In some embodiments, instead of replicating a copy of the full source data set to the destination tenant's storage environment, the system may only replicate records for data elements that identifies the source data set to the destination tenant's storage environment. This is described above in the discussion of FIG. 4. In these embodiments, the records replicated to the destination at 205 may serve as a proxy for the actual data elements, so that the destination tenant does not get the entire data set, but only elements of the data set that it requests and is authorized to receive.

Figure 6:
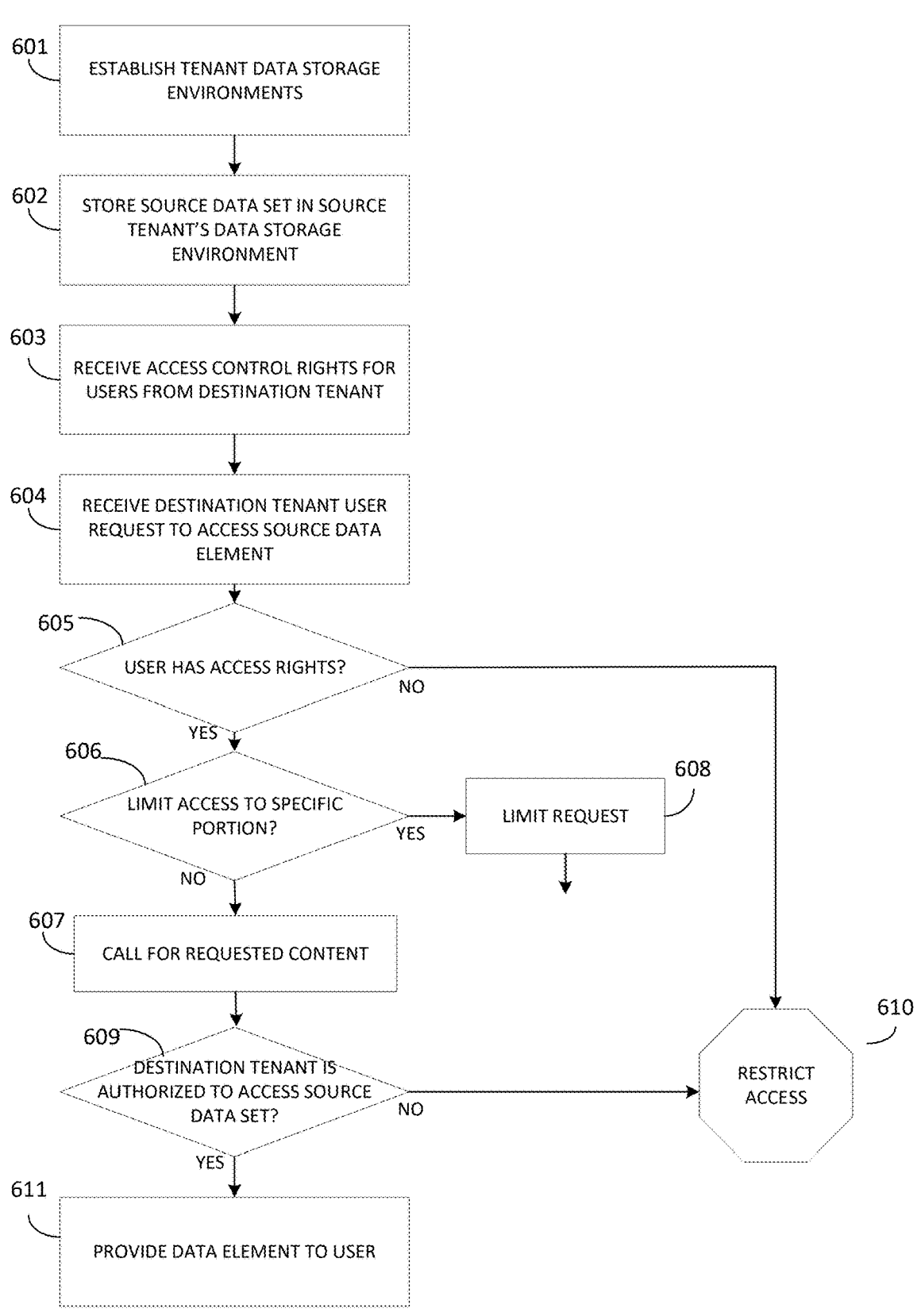
FIG. 6 illustrates an example process by which a data distribution platform may share data by proxy.

Also as noted above in the discussion of FIG. 2, in any of the embodiments above, the system may allow data sharing between tenant organizations without revealing information about any tenant's users to other tenants. FIG. 6 illustrates additional details about a process by which the platform may enable this. At 601 the platform may establish multiple secure data storage environments, each of which is unique to a particular tenant of the platform. For example, as discussed above in the context of FIG. 1, the platform operator may operate and maintain the data storage environments using any of the options discussed above in the context of FIG. 1, or each tenant may operate and maintain its own data storage environment on or with its user electronic device as part of a distributed, peer-to-peer platform.

At 602 the platform will receive a source data set and store the source data set in a source tenant data storage environment that is associated with the source tenant.

At 603 the platform will receive, from a destination tenant, a set of access control rights for individual users that are associated with the destination tenant. (This was also described above as element 220 of FIG. 2.) The access control rights may be in the form of access control data such as an access control list (ACL), an attribute-based access control (ABAC) model, or a role-based access control (RBAC) model. The access control data will include an identifier for each user (as in an ACL), or for a category of users such as users having a particular role or set of attributes (as in an ABAC or RBAC model). Other access control right formats or authorization models may be used. The access control data will also define the type of access rights allowed for the user or user category. For example, the information may include categories of data that the user can access, as well as whether the user is permitted to modify or share the data. The access control rights will be maintained in the destination tenant's secure data storage environment or in a central location accessible to a platform administrator, but it will not be shared with the source tenant or any other tenants. The destination tenant may add users, delete users, or modify the access rights that are associated with its users. These changes also will be maintained in the destination tenant's secure data storage environment or a central location and not be shared with the source tenant or any other tenants.

At 604 the platform receives a request from a destination tenant user to access a content from source data set. The request may be received and processed by a processor associated with the destination tenant, or by a central processor of the platform, but not by the source tenant at this time. The request may include one or more identifiers of data elements in the source data set data that are associated with the content, and other information such as an identifier of the source, as obtained from the records stored in the destination tenant's data storage environment.

At 605 the platform will confirm whether the user is authorized to access the content by determining whether the requested content corresponds to the access control rights for the user, as represented in the ACL or other access control right format. This step may be performed by a processor associated with the destination tenant, or by a central processor of the platform. If the user is not authorized to access the requested content (605: NO), the request will not be sent to the source tenant, and the process will end at 610 without giving the user access to the content. Upon confirming that the user is authorized to access the requested content (605: YES), AT 607 the destination tenant may send a call to the source tenant to return the requested content.

Optionally, before sending the call to the source tenant, if the user is authorized to access the requested content (605: YES), the platform will determine whether the user's access rights are limited to a specific portion of the content at 606. If the user's access rights are limited (606: YES), at 608 the platform may modify the request to limit it to the portion of the requested content that corresponds to the user's access control rights. If not (606: NO), the request need not be modified. Like step 605, step 606 may be performed by a processor associated with the destination tenant, or by a central processor of the platform.

Either before or after the system confirms that the user has access rights, at 609 the system may determine whether the source tenant has authorized the destination tenant to access the source data asset at all. For example, the source tenant may have previously authorized, but since revoked or limited, the destination tenant's access rights. Unlike steps 605 and 606, step 609 will not be done by a processor associated with the destination tenant. Instead, the determination of step 609 will be performed by a processor associated with the source tenant, or by a central processor of the platform. If the destination tenant is not authorized to access the requested content (609: NO), the user will be restricted from accessing the content and the process will end at 610. However, upon confirming that the destination tenant is authorized to access the requested content (609: YES), the source tenant may transfer the data element(s) for the requested content to the destination tenant for presentation to the user at 611.

Optionally, in any of the embodiments described in this document, after the destination tenant is given access to content, one or more of the destination tenant's users may modify the content by editing it, adding comments or metadata to it, or inserting requests for edits. When this happens, the destination tenant may then become a source tenant for the modified content by sharing the modified content with the original source tenant. The source tenant may then distribute the modified content to other tenants, in each case using the processes described in this document and/or other distribution methods.

Figure 7:
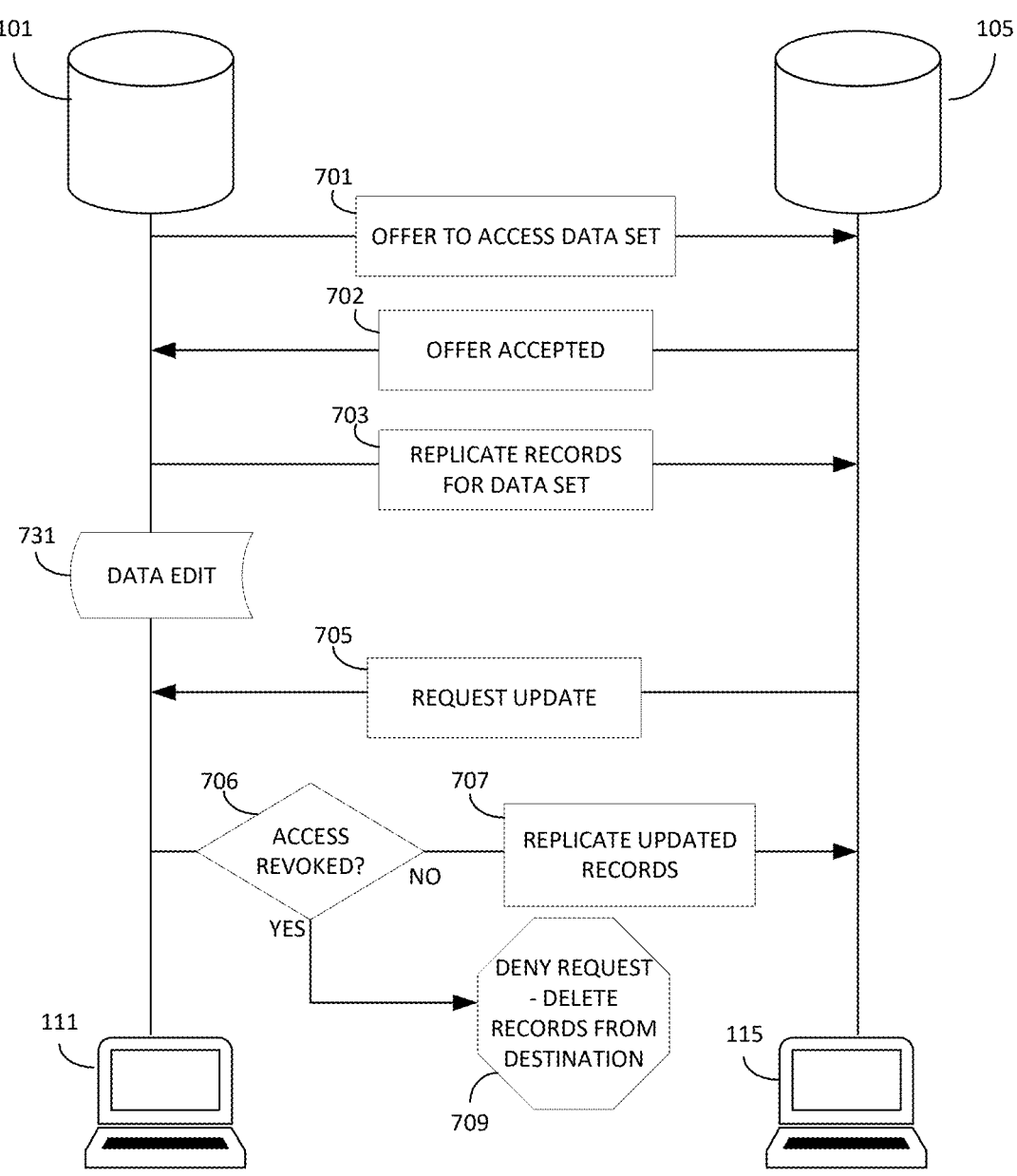
FIG. 7 illustrates additional elements of a process of sharing data by proxy in some embodiments.
Figure 8:
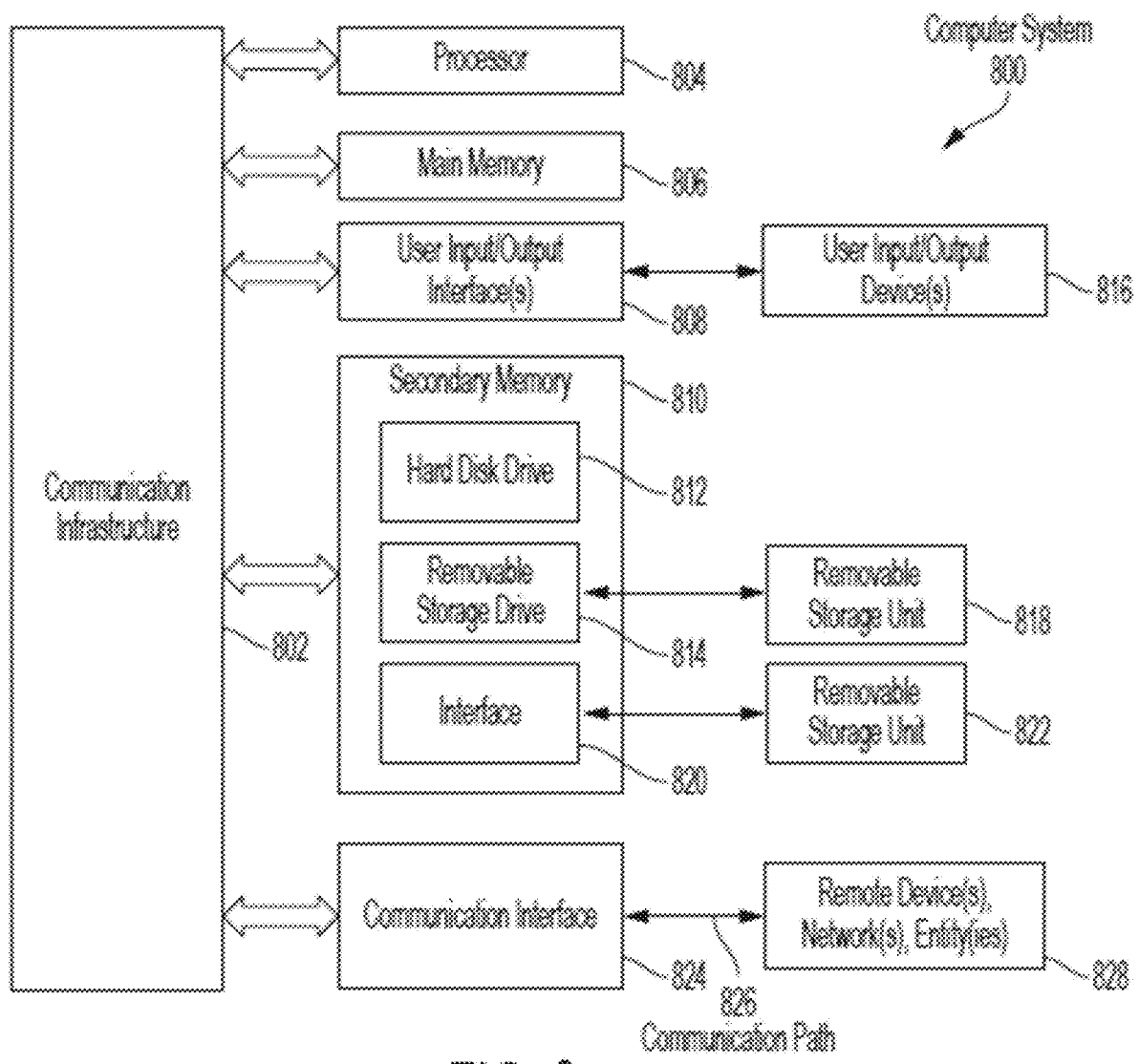
FIG. 8 illustrates example components of an electronic device that may be used with the systems described in this document.

FIG. 7 illustrates additional actions that may occur in the data sharing by proxy process of FIG. 6. The actions of FIG. 7 include elements also discussed above in the context of FIGS. 2 and 4. Accordingly, the discussion of those figures above also can be used to explain FIG. 7. In FIG. 7, at 701 a source tenant (represented by source tenant electronic device 111) offers a destination tenant (represented by source tenant electronic device 115) access to a source data set that is stored in the source tenant's data storage environment 101. If the destination tenant accepts the offer at 702, then at 703 the platform will replicate records (i.e., data element IDs, source tenant ID, and other metadata) for the source data set to the destination tenant's data storage environment 105. Individual data elements may then be shared with the destination tenant's users according to the process discussed above for FIG. 6. Alternatively, data sets may be shared with the destination tenant via the copy process of FIG. 3 or the sync process of FIG. 5, in which case the process of FIG. 6 need not include step 609 since the destination tenant will have a copy of the content.

At 731 the source tenant 111 may update data elements of the source data set, such as by modifying, deleting, or adding data elements. If the copy process of FIG. 3 or the sync process of FIG. 5 is used, these updates may automatically be shared with the destination tenant 115. However, if the share process of FIG. 7 and FIG. 4 is used, the updates may not automatically be shared with the destination tenant 115. Instead, the destination tenant must first send an update request to the source tenant at 705.

So long as the source tenant has not revoked the destination tenant's access to the data set (706: NO), the updated records are replicated to the destination tenant's data storage environment at 707. If the source tenant revoked the destination tenant's access (706: YES) at 709 the system will deny the request and, optionally, the records may be deleted from destination tenant's data storage environment 105 if not already deleted.

The methods described in this document may be implemented by a computing device, or by a computer program product comprising a memory and computer programming instructions. Elements of an example computing device and/or system 800 are disclosed in FIG. 6. Computer system 800 can be any computer capable of performing the functions described in this document.

Computer system 800 includes one or more processors (also called central processing units, or CPUs), such as a processor 804. Processor 804 is connected to a communication infrastructure or bus 802. Optionally, one or more of the processors 804 may each be a graphics processing unit (GPU). In various embodiments, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 also includes user input/output device(s) 816, such as monitors, keyboards, pointing devices, etc., that communicate with communication infrastructure 802 through user input/output interface(s) 808. In various embodiments, at least one of the input/output device(s) 816 is a display monitor or other display device with a display screen.

Computer system 800 also includes a main or primary memory 806, such as random access memory (RAM). Main memory 806 may include one or more levels of cache. Main memory 806 has stored therein control logic (i.e., computer software) and/or data.

Computer system 800 may also include one or more secondary memory devices 810. Secondary memory devices 810 may include, for example, a hard disk drive 812 and/or a removable storage device or drive 814. Removable storage drive 814 may be an external hard drive, a universal serial bus (USB) drive, a memory card such as a compact flash card or secure digital memory, a compact disc drive, an optical storage device, a tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be an external hard drive, a universal serial bus (USB) drive, a memory card such as a compact flash card or secure digital memory, a compact disc, an optical storage disk, and/any other computer data storage device. Removable storage drive 814 reads from and/or writes to removable storage unit 618 in a well-known manner.

According to an example embodiment, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 826, which may be wired and/or wireless, and which may include any combination of LANs, WANs, the Internet, etc. Control logic and/or data may be transmitted to and from computer system 800 via communication path 826.

In some embodiments, a tangible, non-transitory apparatus or article of manufacture comprising a tangible, non-transitory computer useable or readable medium having control logic (software) stored thereon may be referred to in this document as a "computer program product" or program storage device. This includes, but is not limited to, computer system 800, main memory 806, secondary memory 810, and removable storage units 818 and 822, as well as tangible articles of manufacture embodying any combination of the foregoing. Such control logic, when executed by one or more data processing devices (such as computer system 800), causes such data processing devices to operate as described in this document.

Based on the teachings contained in this disclosure, it will be apparent to persons skilled in the relevant art(s) how to make and use embodiments of this disclosure using data processing devices, computer systems and/or computer architectures other than that shown in FIG. X.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described in this document.

Terminology that is relevant to this disclosure includes:

An "electronic device" or a "computing device" refers to a device or system that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, gaming systems, televisions, digital home assistants and mobile electronic devices such as smartphones, fitness tracking devices, wearable virtual reality devices, Internet-connected wearables such as smart watches and smart eyewear, personal digital assistants, cameras, tablet computers, laptop computers, media players and the like. Electronic devices also may include appliances and other devices that can communicate in an Internet-of-things arrangement, such as smart thermostats, refrigerators, connected light bulbs and other devices. Electronic devices also may include components of vehicles such as dashboard entertainment and navigation systems, as well as on-board vehicle diagnostic and operation systems. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container also may be considered an electronic device. In the discussion above, a client device, server device, virtual machine or container may be referred to simply as a "device" for brevity. Additional elements that may be included in electronic devices are discussed above in the context of FIG. 6.

The terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process.

The terms "memory," "memory device," "computer-readable medium," "data store," "data storage facility" and the like each refer to a non-transitory device on which computer-readable data, programming instructions or both are stored. Except where specifically stated otherwise, the terms "memory," "memory device," "computer-readable medium," "data store," "data storage facility" and the like are intended to include single device embodiments, embodiments in which multiple memory devices together or collectively store a set of data or instructions, as well as individual sectors within such devices. A computer program product is a memory device with programming instructions stored on it.

In this document, the term "communication channel" means a wired or wireless path via which a first device sends communication signals to and/or receives communication signals from one or more other devices. Devices are "communicatively connected" if the devices are able to send and/or receive data via one or more communication channels. "Electronic communication" refers to the transmission of data via one or more signals between two or more electronic devices, whether through a wired or wireless network, and whether directly or indirectly via one or more intermediary devices. The network may include or is configured to include any now or hereafter known communication networks such as, without limitation, a BLUETOOTH® communication network, a Z-Wave® communication network, a wireless fidelity (Wi-Fi) communication network, a ZigBee communication network, a HomePlug communication network, a Power-line Communication (PLC) communication network, a message queue telemetry transport (MQTT) communication network, a MTConnect communication network, a cellular network a constrained application protocol (CoAP) communication network, a representative state transfer application protocol interface (REST API) communication network, an extensible messaging and presence protocol (XMPP) communication network, a cellular communications network, any similar communication networks, or any combination thereof for sending and receiving data. As such, network 204 may be configured to implement wireless or wired communication through cellular networks, WiFi, BlueTooth, Zigbee, RFID, BlueTooth low energy, NFC, IEEE 802.11, IEEE 802.15, IEEE 802.16, Z-Wave, Home Plug, global system for mobile (GSM), general packet radio service (GPRS), enhanced data rates for GSM evolution (EDGE), code division multiple access (CDMA), universal mobile telecommunications system (UMTS), long-term evolution (LTE), LTE-advanced (LTE-A), MQTT, MTConnect, CoAP, REST API, XMPP, or another suitable wired and/or wireless communication method. The network may include one or more switches and/or routers, including wireless routers that connect the wireless communication channels with other wired networks (e.g., the Internet). The data communicated in the network may include data communicated via short messaging service (SMS), multimedia messaging service (MMS), hypertext transfer protocol (HTTP), direct data connection, wireless application protocol (WAP), e-mail, smart energy profile (SEP), ECHONET Lite, OpenADR, MTConnect protocol, or any other protocol.

The term "classifier" means an automated process by which an artificial intelligence system may assign a label or category to one or more data points. A classifier includes an algorithm that is trained via an automated process such as machine learning. A classifier typically starts with a set of labeled or unlabeled training data and applies one or more algorithms to detect one or more features and/or patterns within data that correspond to various labels or classes. The algorithms may include, without limitation, those as simple as decision trees, as complex as Naïve Bayes classification, and/or intermediate algorithms such as k-nearest neighbor. Classifiers may include artificial neural networks (ANNs), support vector machine classifiers, and/or any of a host of different types of classifiers. Once trained, the classifier may then classify new data points using the knowledge base that it learned during training. The process of training a classifier can evolve over time, as classifiers may be periodically trained on updated data, and they may learn from being provided information about data that they may have misclassified. A classifier will be implemented by a processor executing programming instructions, and it may operate on large data sets such as image data, LIDAR system data, and/or other data.

A "machine learning model" or a "model" refers to a set of algorithmic routines and parameters that can predict an output(s) of a real-world process (e.g., prediction of an object trajectory, a diagnosis or treatment of a patient, a suitable recommendation based on a user search query, etc.) based on a set of input features, without being explicitly programmed. A structure of the software routines (e.g., number of subroutines and relation between them) and/or the values of the parameters can be determined in a training process, which can use actual results of the real-world process that is being modeled. Such systems or models are understood to be necessarily rooted in computer technology, and in fact, cannot be implemented or even exist in the absence of computing technology. While machine learning systems utilize various types of statistical analyses, machine learning systems are distinguished from statistical analyses by virtue of the ability to learn without explicit programming and being rooted in computer technology.

"Training" of a machine learning model may include building and/or updating a machine learning model from a sample dataset (referred to as a "training set"), evaluating the model against one or more additional sample datasets (referred to as a "validation set" and/or a "test set") to decide whether to keep the model and to benchmark how good the model is, and using the model in "production" to make predictions or decisions against live input data captured by an application service. The training set, the validation set, and/or the test set, as well as the machine learning model are often difficult to obtain and should be kept confidential. The current disclosure describes systems and methods for providing a secure machine learning pipeline that preserves the privacy and integrity of datasets as well as machine learning models.

The features and functions described above, as well as alternatives, may be combined into many other different systems or applications. Various alternatives, modifications, variations or improvements may be made by those skilled in the art, each of which is also intended to be encompassed by the disclosed embodiments.

As described above, this document discloses system, method, and computer program product embodiments for distributing data among multiple tenants. The system embodiments include a local computing device, which may have access to one or more remote computing devices. In some embodiments, one or more of the remote computing devices also may be part of the system. The computer program embodiments include programming instructions, stored in a memory device, that are configured to cause a processor to perform the methods described in this document.

These embodiments can be further illustrated by the following clauses:

Clause 1: A method of distributing data between a plurality of users of a data distribution platform comprises, by a data distribution platform in which each of a plurality of tenants of the platform is provided a secure data storage environment that is unique to that tenant: (i) storing a source data set in a source tenant data storage environment that is associated with a source tenant; (ii) receiving, from a destination tenant, a set of access control rights for a plurality of users that are associated with the destination tenant; and (iii) in response to receiving a request to access content in the source data set from a first user that is associated with the destination tenant: (a) determining whether the requested content corresponds to the access control rights for the first user, (b) determining whether the source tenant has authorized the destination tenant to access the source data set, and (c) in response to confirming that the requested content corresponds to the access control rights for the first user and confirming that the source tenant has authorized the destination tenant to access the source data set, providing the first user with access to the requested content. The source tenant is not provided any information about the set of access control rights or the identity of the first user.

Clause 2: The method of clause 1, further comprising (a) determining what portion of the requested content corresponds to the access control rights for the first user, and (b) when providing the first user with the requested content, only providing the portion of the requested content that corresponds to the access control rights for the first user.

Clause 3: The method of clause 1 or 2, wherein confirming that the requested content corresponds to the access control rights for the first user is performed by a processor associated with the destination tenant.

Clause 4: The method of clause 3, wherein confirming that the source tenant has authorized the destination tenant to access the source data set is performed by a processor associated with the source tenant.

Clause 5: The method of clause 3, wherein confirming that the source tenant has authorized the destination tenant to access the source data set comprises: (i) by the processor associated with the destination tenant, sending a processor associated with the source tenant a call to return the requested content, and (ii) by the processor associated with the source tenant: (a) determining whether the source tenant has authorized the destination tenant to access the source data set, and (b) in response to confirming that the source tenant has authorized the destination tenant to access the source data set, sending the destination tenant one or more data elements from the source data set that comprise the requested content.

Clause 6: The method of any of clauses 1-5, further comprising, before receiving the request to access the content in the source data set from the first user, (i) presenting the destination tenant with an offer to access the source data set, and (ii) replicating records that include identifiers for data elements of the source data set to a destination tenant data storage environment that is associated with the destination tenant in response to receiving an acceptance of the offer from the destination tenant. The request to access the content in the source data set includes one or more of the identifiers.

Clause 7: The method of clause 6, wherein each of the records also includes an identifier of the source tenant, and the request to access the content in the source data set also comprises the identifier of the source tenant.

Clause 8: The method of any of clauses 1-7 further comprising, in response to receiving a request from the destination tenant for updated records for the source data set: (i) confirming that the destination tenant is still authorized to access the source data set; (ii) identifying any records that have been changed, updated, or deleted since the records were last replicated to a destination tenant data storage environment that is associated with the destination tenant; and (iii) replicating the identified records to the destination tenant data storage environment.

Clause 9: The method of clause 6, further comprising: (i) presenting a plurality of additional destination tenants with access to the source data set by replicating the records of the source data set to each of a plurality of additional destination tenant data storage environments; and (ii) receiving, from each additional destination tenant, an additional set of access control rights for a plurality of users that are associated with that additional destination tenant. The source tenant is not provided any information about any of the sets of access control rights or the identity of any of the users that are associated with any additional destination tenant.

Clause 10: A data distribution platform includes a source tenant data storage environment that is uniquely associated with a source tenant and that stores a source data set. The platform also includes a destination tenant data storage environment that is uniquely associated with a destination tenant and that stores a set of access control rights for a plurality of users that are associated with the destination tenant. The platform also includes a processor and a memory containing programming instructions that are configured to cause the processor to implement a method according to any of clauses 1-9.

Clause 11: A method of distributing data between a plurality of users of a data distribution platform in which each of a plurality of tenants of the platform is provided a secure data storage environment that is unique to that tenant. The method includes: (i) receiving, from a source tenant, a request to give one or more destination tenants access to a source data set that is stored on a source tenant data storage environment that is associated with the source tenant; (ii) presenting a first destination tenant with an offer to receive a copy of the source data set; and (iii) in response to receiving an acceptance of the offer from the first destination tenant, providing the first destination tenant access to the source data set by replicating the copy of the source data set to a first destination tenant data storage environment that is associated with the first destination tenant. The replicating uses an asynchronous process in which, when one or more data elements from the source data set is not successfully transmitted to the first destination tenant data storage environment: (a) transmission of other data elements from the source data set continues until the end of the source data set is reached, and (b) the platform subsequently transmits the one or more data elements that were not successfully transmitted to the first destination tenant data storage environment.

Clause 12: The method of clause 11, wherein the first destination tenant is an organization having a plurality of users who have permission to access the copy of the source data set that is in the first destination tenant data storage environment, and the source tenant is not provided identifying information about at least some of the plurality of users.

Clause 13: The method of clause 11 or 12 further comprising receiving, from the source tenant, a classification of the source data set as Copy, Share or Sync.

Clause 14: The method of any of clauses 11-13 wherein, in response to receiving a classification of the source data set as Copy, the method further comprises, after replicating the source data set to the first destination tenant data storage environment and upon receiving a data edit from the source tenant: (a) creating a modified source data set by saving the data edit to the source data set that is stored in the source tenant data storage environment; (b) not saving the data edit to the copy of the source data set that is stored in the first destination tenant data storage environment; (c) presenting the first destination tenant with an offer to receive a copy of the modified source data set; and (d) not granting the source tenant an ability to delete any copy that is in the first destination tenant data storage environment.

Clause 15: The method of any of clauses 11-13 wherein, in response to receiving a classification of the source data set as Share, replicating the data set to the first destination tenant comprises: (a) initially only replicating records for data elements in the source data set, but not the data elements, to the first destination tenant data storage environment; and (b) subsequently replicating specific data elements in the source data set in response to receiving a request from the destination tenant for the specific data elements.

Clause 16: The method of any of clauses 11-13 wherein, in response to receiving a classification of the source data set as Sync, the method also includes, after replicating the data set to the first destination tenant and upon receiving a data edit from the source tenant: (a) saving the data edit to the source data set that is set that is stored in the source tenant data storage environment; and (b) automatically propagating the data edit to the copy that is in the first destination tenant data storage environment without requiring an update request from the first destination tenant.

Clause 17: The method of clause 16 further comprising, in response to receiving a revoke sync request from the source tenant, not propagating additional data edits to the copy that is in the first destination tenant data storage environment.

Clause 18: The method of any of clauses 11-17, further comprising: (a) presenting a plurality of additional destination tenants with the offer to access the source data set; and (b) in response to receiving an acceptance of the offer from any of the additional destination tenants, providing that additional destination tenant access to the source data set by replicating an additional copy of the source data set to an additional destination tenant data storage environment that is associated with that additional destination tenant. The replicating to the additional destination tenant data set also uses an asynchronous process in which: (i) when one or more data elements from the source data set is not successfully transmitted to the additional destination tenant data storage environment, transmission of other data elements from the source data set continues until the end of the source data set is reached; and (ii) the platform subsequently transmits the one or more data elements that were not successfully transmitted to the additional destination tenant data storage environment.

Clause 19: The method of clause 18 wherein, after a period of time in which any data elements that were not successfully transmitted are subsequently transmitted, the source data set is completely replicated to all destination tenants that accepted the offer.

Clause 20: A data distribution platform includes a source tenant data storage environment that is uniquely associated with a source tenant and that stores a source data set. The platform also includes a destination tenant data storage environment that is uniquely associated with a destination tenant and that stores a set of access control rights for a plurality of users that are associated with the destination tenant. The platform also includes a processor and a memory containing programming instructions that are configured to cause the processor to implement a method according to any of clauses 11-19.

The invention claimed is:

1. A method of distributing data between a plurality of users of a data distribution platform, the method comprising:
  by a data distribution platform in which each of a plurality of tenants of the platform is provided a secure data storage environment that is unique to that tenant:
    receiving, from a source tenant, a request to give one or more destination tenants access to a source data set that is stored on a source tenant data storage environment that is associated with the source tenant;
    presenting a first destination tenant with an offer to receive a copy of the source data set; and
    in response to receiving an acceptance of the offer from the first destination tenant, providing the first destination tenant access to the source data set by replicating the copy of the source data set to a first destination tenant data storage environment that is associated with the first destination tenant,
    wherein the replicating uses an asynchronous process in which, when one or more data elements from the source data set is not successfully transmitted to the first destination tenant data storage environment:
      transmission of other data elements from the source data set continues until the end of the source data set is reached, and
      the platform subsequently transmits the one or more data elements that were not successfully transmitted to the first destination tenant data storage environment.

2. The method of claim 1, wherein:
  the first destination tenant is an organization having a plurality of users who have permission to access the copy of the source data set that is in the first destination tenant data storage environment; and
  the source tenant is not provided identifying information about at least some of the plurality of users.

3. The method of claim 1 further comprising receiving, from the source tenant, a classification of the source data set as Copy, Share or Sync.

4. The method of claim 1 further comprising, in response to receiving a classification of the source data set as Copy, the method also includes, after replicating the source data set to the first destination tenant data storage environment and upon receiving a data edit from the source tenant:

creating a modified source data set by saving the data edit to the source data set that is stored in the source tenant data storage environment;

not saving the data edit to the copy of the source data set that is stored in the first destination tenant data storage environment;

presenting the first destination tenant with an offer to receive a copy of the modified source data set; and not granting the source tenant an ability to delete any copy that is in the first destination tenant data storage environment.

5. The method of claim 1 wherein, in response to receiving a classification of the source data set as Share:

replicating the data set to the first destination tenant comprises:

initially only replicating records for data elements in the source data set, but not the data elements, to the first destination tenant data storage environment; and subsequently replicating specific data elements in the source data set in response to receiving a request from the destination tenant for the specific data elements.

6. The method of claim 1 wherein, in response to receiving a classification of the source data set as Sync, the method also includes, after replicating the data set to the first destination tenant:

upon receiving a data edit from the source tenant, saving the data edit to the source data set that is stored in the source tenant data storage environment; and automatically propagating the data edit to the copy that is in the first destination tenant data storage environment without requiring an update request from the first destination tenant.

7. The method of claim 6 further comprising, in response to receiving a revoke sync request from the source tenant, not propagating additional data edits to the copy that is in the first destination tenant data storage environment.

8. The method of claim 1, further comprising:

presenting a plurality of additional destination tenants with the offer to access the source data set; and in response to receiving an acceptance of the offer from any of the additional destination tenants, providing that additional destination tenant access to the source data set by replicating an additional copy of the source data set to an additional destination tenant data storage environment that is associated with that additional destination tenant, wherein the replicating to the additional destination tenant data set also uses an asynchronous process in which:

when one or more data elements from the source data set is not successfully transmitted to the additional destination tenant data storage environment, transmission of other data elements from the source data set continues until the end of the source data set is reached, and the platform subsequently transmits the one or more data elements that were not successfully transmitted to the additional destination tenant data storage environment.

9. The method of claim 8 wherein, after a period of time in which any data elements that were not successfully transmitted are subsequently transmitted, the source data set is completely replicated to all destination tenants that accepted the offer.

10. A data distribution platform, comprising:

a source tenant data storage environment that is uniquely associated with a source tenant and that stores a source data set;

a destination tenant data storage environment that is uniquely associated with a destination tenant;

a processor; and a memory containing programming instructions that are configured to cause the processor to, in response to receiving a request to from a source tenant to give one or more destination tenants access to the source data set:

presenting a first destination tenant with an offer to receive a copy of the source data set, and in response to receiving an acceptance of the offer from the first destination tenant, providing the first destination tenant access to the source data set by replicating the copy of the source data set to data storage environment that is associated with the first destination tenant, wherein the replicating uses an asynchronous process in which, when one or more data elements from the source data set is not successfully transmitted to the first destination tenant data storage environment:

transmission of other data elements from the source data set continues until the end of the source data set is reached, and the system subsequently transmits the one or more data elements that were not successfully transmitted to the first destination tenant data storage environment.

11. The system of claim 10, wherein:

the first destination tenant is an organization having a plurality of users who have permission to access the copy of the source data set that is in the first destination tenant data storage environment; and the source tenant is not provided identifying information about at least some of the plurality of users.

12. The system of claim 10, wherein the source data set is associated with a classification that comprises Copy, Share or Sync.

13. The system of claim 10 further comprising programming instructions to, in response to the source data set being classified as Copy, after replicating the source data set to the first destination tenant data storage environment and upon receiving a data edit from the source tenant:

create a modified source data set by saving the data edit to the source data set that is stored in the source tenant data storage environment;

not save the data edit to the copy of the source data set that is stored in the first destination tenant data storage environment;

present the first destination tenant with an offer to receive a copy of the modified source data set; and not grant the source tenant an ability to delete any copy that is in the first destination tenant data storage environment.

14. The system of claim 1, further comprising programming instructions to replicate the source data set to the first destination tenant comprise instructions to, in response to the source data set being classified as Share:

initially only replicate records for data elements in the source data set, but not the data elements, to the first destination tenant data storage environment; and subsequently replicate specific data elements in the source data set in response to receiving a request from the destination tenant for the specific data elements.

15. The method of claim 1, further comprising programming instructions to, in response to receiving a classification of the source data as Sync, after replicating the data set to the first destination tenant:

upon receiving a data edit from the source tenant, save the data edit to the source data set that is stored in the source tenant data storage environment; and automatically propagate the data edit to the copy that is in the first destination tenant data storage environment without requiring an update request from the first destination tenant.

16. The system of claim 15 further comprising programming instructions to, in response to receiving a revoke sync request from the source tenant, not propagate additional data edits to the copy that is in the first destination tenant data storage environment.

17. The system of claim 10, further comprising programming instructions to:

present a plurality of additional destination tenants with the offer to access the source data set; and in response to receiving an acceptance of the offer from any of the additional destination tenants, provide that additional destination tenant access to the source data set by replicating an additional copy of the source data set to an additional destination tenant data storage environment that is associated with that additional destination tenant, wherein the instructions to replicate to the additional destination tenant data set comprise instructions to use an asynchronous process in which:

when one or more data elements from the source data set is not successfully transmitted to the additional destination tenant data storage environment, transmission of other data elements from the source data set continues until the end of the source data set is reached, and the platform subsequently transmits the one or more data elements that were not successfully transmitted to the additional destination tenant data storage environment.

18. The system of claim 17, wherein the system is configured to, after a period of time in which any data elements that were not successfully transmitted are subsequently transmitted, have completely replicated the source data set to all destination tenants that accepted the offer.

* * * * *